March 26, 1968 L. S. KONGABLE 3,375,399

TELEVISION SWEEP CIRCUIT USING GATE CONTROLLED SWITCHES

Filed May 19, 1964

INVENTOR.

Lowell S. Kongable

BY Mueller & Aichele

Attys.

United States Patent Office 3,375,399
Patented Mar. 26, 1968

3,375,399
TELEVISION SWEEP CIRCUIT USING GATE CONTROLLED SWITCHES

Lowell S. Kongable, Prospect Heights, Ill., assignor to Motorola, Inc., Franklin Park, Ill., a corporation of Illinois Filed May 19, 1964, Ser. No. 368,479
6 Claims. (Cl. 315—27)

ABSTRACT OF THE DISCLOSURE

A sweep signal generator for a cathode ray beam includes a bistable switch device for conducting current into a deflection yoke so a sawtooth deflection signal is developed therein. The switching device is triggered into conduction and triggered out of conduction by signals synchronized with the television synchronizing signals.

Figure 1:
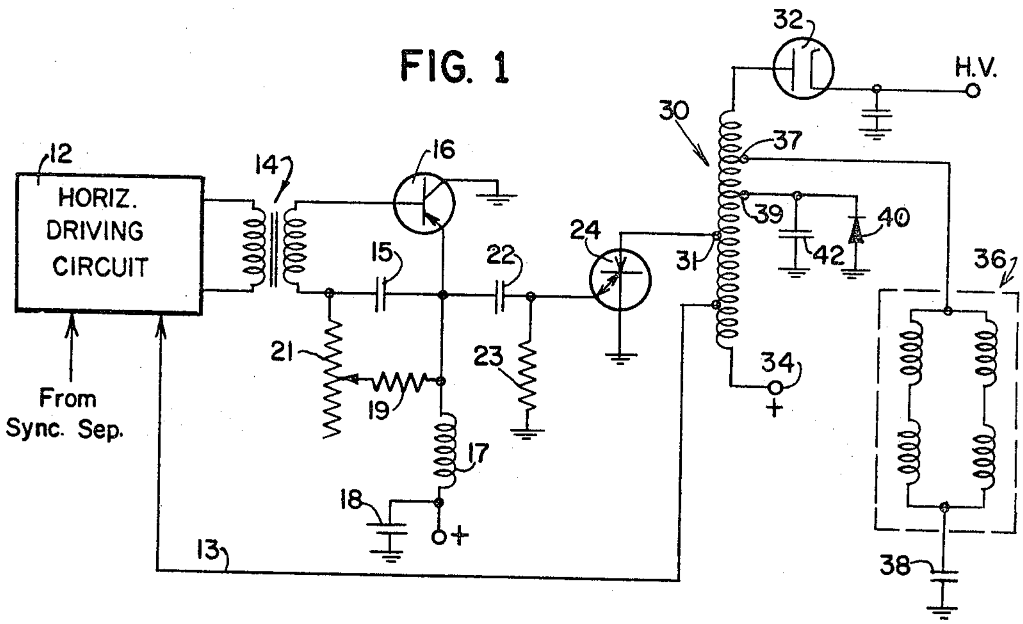

This invention relates to sweep circuits, and in particular to an improved sweep circuit utilizing semiconductor devices for applying a sawtooth current wave to the deflection yokes of a cathode ray tube.

The advantages of transistors over vacuum tubes are well known, and there is increased activity in the development of transistorized television receivers. Transistors, however, are inherently low impedance, high current devices, and accordingly the resulting circuitry used therewith requires somewhat more costly components than related high impedance circuits. In addition, transistors are susceptible to voltage breakdown and burn-out from overload, placing limitations on the manner in which they may be operated in a particular circuit arrangement.

The foregoing considerations are particularly applicable to the high current switching circuits encountered in transistorized sweep circuits, where low impedance deflection yokes and output transformers are necessary to limit the retrace voltage pulse to a level that will not damage the switching transistor. In such systems a switching transistor periodically connects a winding on the output transformer to a DC supply, during which times there is a linear rise in current through the deflection yoke to supply the desired sawtooth current waveform. After a predetermined interval the transistor is cut off and there is an interchange of stored energy between the inductance of the output transformer and deflection yoke and the capacitance of the system. It is readily apparent that a high impedance transformer and yoke will give rise to severe switching transients, and accordingly low impedances, requiring high charging current, are used. This high current operation also requires large amounts of driving power to maintain the switching transistor in a conducting state while current is being supplied to the deflection yoke.

It is therefore an object of the invention to provide an improved sweep circuit for transistorized television receivers.

Another object is to provide an improved sweep circuit utilizing semiconductor devices, which circuit enables the use of a high impedance deflection yoke and output transformer to provide an economical deflection system for transistorized television receivers A still further object of the invention is to provide an improved semiconductor switching circuit for energizing the deflection yokes of a cathode ray tube, requiring a minimum of power from a driving source to produce the desired switching action.

A more specific object of the invention is to provide a deflection system for a television receiver utilizing a silicon gate controlled switch responsive to a driving signal to periodically cause a linear rising sawtooth current flow in the deflection yokes associated with the cathode ray tube of the receiver.

Figure 2:
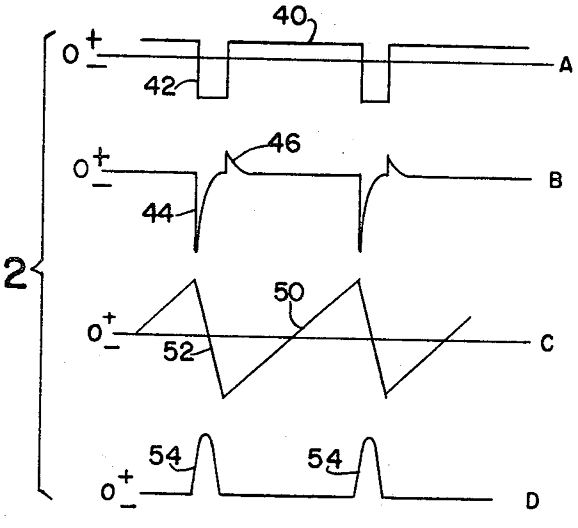

Other objects, as well as the features and attending advantages of the invention will become apparent from the following description when taken in conjunction with the accompanying drawings, in which:

FIG. 1 is a schematic diagram of a preferred embodiment of the invention particularly adapted to supply sawtooth current waves to the horizontal deflection yokes of the cathode ray tube of a television receiver; and FIG. 2 is a representation of various waveforms illustrating the operation of the circuit of FIG. 1.

In practicing the invention there is provided a deflection winding for applying a deflection wave having a trace portion and a retrace portion to the yoke of a cathode ray tube. A silicon gate controlled switch is connected in circuit between the deflection winding and a reference point such that the silicon gate controlled switch completes a conductive path through the winding to the reference point for a DC current supplied to the winding when the silicon gate controlled switch is in a conductive state. Because of the inductance of the winding this results in a sawtooth current wave therein during the trace portion of the deflection wave. When the silicon gate controlled switch is switched to a non-conductive state energy stored in the winding and in the deflection yoke produces a ringing action during the retrace portion of the deflection wave.

The silicon gate controlled switch is switched between states of conduction and non-conduction by a control signal applied to its gate electrode. Preferably this control signal is a differentiated square wave having a positive-going portion substantially less in magnitude with respect to a zero reference axis than its negative-going portion.

Referring now to FIG. 1, horizontal driving circuit 12 provides a driving wave for the system. This circuit may be a controlled blocking oscillator or multivibrator and produces a synchronized signal of 15.75 kc., having a generally rectangular waveform of a type subsequently discussed. An input for horizontal driving circuit 12 is derived from the synchronizing signal separator circuit of the receiver and processed by a phase detector associated with driving circuit 12 in the known manner. For additional stability an automatic frequency control signal may also be supplied to the control section of horizontal driving circuit 12 from the horizontal deflection transformer of the receiver via lead 13.

The signal supplied by horizontal driving circuit 12 is coupled to driving transistor 16 by transformer 14. The collector electrode of transistor 16 is grounded and an input signal is supplied between its base and emitter electrodes by the secondary winding of transformer 14. One end of the secondary winding of transformer 14 is directly connected to the base electrode of transistor 16, and the other end thereof to the emitter electrode of transistor 16 by capacitor 15. DC operating voltage is supplied to the emitter electrode of transistor 16 through a choke coil 17, and additional by-pass for the DC supply for transistor 16 may be provided by capacitor 18. Resistor 19 and potentiometer 21, connected between the emitter electrode of transistor 16 and the secondary winding of transformer 14, provide emitter-base bias for transistor 16. Adjustment of potentiometer 21 allows the zero reference level of the square wave signal derived from transistor 16 to be varied.

The output of transistor 16, derived from its emitter electrode, is coupled to the gate electrode of silicon gate controlled switch 24 by capacitor 22. The gate electrode of silicon gate controlled switch 24 may also be returned to ground by resistor 23 to provide differentiation of the control signal applied thereto in the manner hereinafter described. The cathode electrode of silicon gate controlled switch 24 is returned directly to ground. The anode electrode of silicon gate controlled switch 24 is connected to a tap point on horizontal output transformer 30.

As is standard practice, horizontal output transformer 30 may be an auto-transformer having one end connected to high voltage rectifier 32 and the other end connected to a DC voltage supply at terminal 34. One end of horizontal deflection yoke 36 is connected to tap point 37 on horizontal output transformer 30. The other end of horizontal deflection yoke 36 is returned to ground by capacitor 38. It is to be understood that horizontal deflection yoke 36 includes interconnected deflection coils suitably positioned around the neck of the cathode ray tube of the receiver. Tap point 39 of horizontal output transformer 30 is connected to damper diode 40 and capacitor 42.

Silicon gate controlled switch 24 is a type of PNPN silicon controlled rectifier in which a signal of appropriate polarity applied to its gate electrode can be used to turn the device off as well as on. Accordingly such a device may be considered a bistable semiconductor switch. Suitable silicon gate controlled switches are available from Texas Instruments, Inc., designated as types TI–X120A0 through TI–X120A02. Other silicon gate controlled switches are available from Motorola, Inc., under the designation types MGCS821–1 through MGCS821–6. Such devices include anode, cathode and gate electrodes and may be turned on by an application of a pulse to the gate electrode which is positive with respect to the cathode electrode and turned off by application of a pulse to the gate electrode which is negative with respect to the cathode electrode. A general description of silicon gate controlled switches (or bistable semiconductor switches) of the type described may be found in an article entitled "High-Power Solid-State Devices" by I. A. Lesk et al., I.E.E.E. Spectrum, January 1964, at pages 107–108.

In operation a suitable positive-going pulse applied to the gate electrode of silicon gate controlled switch 24 causes it to conduct to complete a path between terminal 34 and ground, resulting in a current flow through the lower portion or winding of horizontal output transformer 30 (which may be considered a primary winding). Since horizontal output transformer is essentially inductive this current increases linearly with time to produce an essentially sawtooth current wave. This sawtooth current wave, in turn, is supplied to deflection yoke 36 to provide horizontal deflection of the beam of the cathode ray tube in the desired manner. When this current has reached a desired peak amplitude, a negative-going wave is applied to gate electrode of silicon gate controlled switch 24 to cause abrupt cutoff thereof. At this time energy stored in horizontal output transformer 30 and deflection yoke 36 is released and the circuit tends to oscillate at a frequency determined primarily by the inductance of horizontal output transformer 30 and capacitor 42 and the distributed capacitance of the system. This effectively tunes the system to the retrace frequency desired for horizontal deflection. Damper diode 40 functions to limit this ringing action to one-half cycle of oscillation by clamping the transients to ground when they tend to reverse polarity. At the same time high amplitude voltage pulses are supplied to the cathode of high voltage rectifier 32 and are rectified and filtered to provide the desired second anode voltage for the cathode ray tube of the receiver.

Particular reference should now be made to waveforms A, B, C and D of FIG. 2, which waveforms are suitably referenced to the points at which they appear in the circuit of FIG. 1. Waveform A, derived from the emitter electrode of transistor 16, is generally rectangular and has a positive-going portion 40 (occurring during trace) and a negative-going portion 42 (occurring during retrace). It is a characteristic of silicon gate controlled switch 24 that it requires less energy for turn-on than for turn-off. In addition, once the device is switched to either state, it is not necessary to supply a holding current or bias to its gate electrode. Thus, as shown, waveform A may be asymmetrical with respect to a zero reference level such that the amplitude of positive portion 40 is less than the amplitude of negative portion 42.

Further conservation of driving energy for the gate of silicon gate controlled switch 24 may be realized by differentiating the square wave signal applied to the gate electrode of silicon gate control switch 24. This is illustrated by the waveform B of FIG. 2. As therein shown, it is only necessary to provide a negative-going pulse 44 at the leading edge of the portion 42 of waveform A and a positive-going pulse 46 at its trailing edge. The desired differentiation takes place by selection of the time constant of the RC network comprised of capacitor 22 and resistor 23. It is to be understood, however, that proper switching action may also be achieved by the waveform A without differentiation, in which instance resistor 23 may be eliminated. Differentiation is desirable in that it conserves driving energy required for switching action. In either instance, and as mentioned, it requires less energy to turn silicon gate controlled switch 24 on than to turn it off. Accordingly, and to further minimize driving power requirements, wave A (as well as the differentiated pulses of wave B) is made asymmetrical with respect to a zero reference axis. This may be accomplished by varying the duty cycle of the wave from driving circuit 12.

When silicon gate controlled switch 24 is switched on by a positive-going pulse, the current through deflection yoke 36 rises linearly as shown by portion 50 of waveform C. Capacitor 38, in the ground return path for yoke 36, is used to enhance linearity of this portion of the current wave in yoke 36. When silicon gate controlled switch 24 is cutoff by application of negative-going pulses to its gate electrode, energy stored in horizontal output transformer 30 and deflection yoke 36 is transferred to capacitor 42 (and the distributed capacitance of the system) and a ringing operation commences. This provides retrace portion 52 of wave C. Continued oscillations are prevented by damper diode 40, and with a properly timed positive-going gating pulse (as provided by portions 40 or 46 of waveforms A or B) linear trace 50 again starts after a half cycle of ringing. Generally the initial part of the trace portion 50 is provided by the current which flows through the damper diode 40 as a result of the termination of the one-half cycle of ringing during retrace. When the current through the diode 40 decays at least partially, the gate controlled switch 24 becomes conductive to provide the terminal part of the trace portion. Alternatively the gate controlled switch 24 could supply substantially all of the trace portion 50. During the retrace portion of wave C, high amplitude voltage pulses 54 of wave D are induced in horizontal output transformer 30. The peak amplitude of these pulses may be in the order of several hundred volts and are stepped up by the upper windings of transformer 30 and rectified by high voltage rectifier 32 to provide the desired high voltage for the television receiver.

Available silicon gate controlled switches may be operated with 400 volts or more applied to its anode. This is contrasted with the maximum breakdown voltage for available germanium power transistors for use in television sweep circuits, which is in the order of 150 volts. Thus it can be seen that the voltage operating level of the horizontal deflection system is greatly increased, requiring less current for the same deflection energy for the electron beam of the cathode ray tube, as provided by yoke 36. This is advantageous in that a high impedance system, with attending economy of circuit components, can be realized. Substantial cost reductions are possible, for example, in components such as horizontal output transformer 30, deflection yoke 36, and capacitor 38.

In addition, available gate control switches may be switched on the 0.05 ampere, 3.5 volt positive-going pulse and off with a .5 ampere, 10 volt negative-going pulse. Since no holding current is required from the driving source, total energy need not be great. As noted, suitable power transistors for cathode ray tube deflection circuits may require as much as two amperes forward bias supplied to their base electrode to maintain them conducting, which bias must be supplied during the entire trace period of the deflection wave. Thus it is readily apparent that the driving power requirements of horizontal driving circuit 12 may be greatly reduced.

The invention provides, therefore, a simple and reliable semiconductor deflection circuit for applying a sawtooth current wave to the deflection yokes of a cathode ray tube. The circuit operates at substantially higher voltage levels than conventional transistor circuits, resulting in a higher impedance circuit and economy of circuit components. In addition, the circuit requires appreciably less driving power to produce the desired switching action than in conventional transistor circuits.

What is claimed is:

1. A deflection system providing a deflection wave having a trace portion and a retrace portion to the deflection yoke of a cathode ray tube, said system including in combination, deflection winding means, direct current power supply means adapted to supply current to said deflection winding means, a silicon gate controlled switch having input, output and control portions, means connecting the input and output portions of said silicon gate controlled switch in series with said deflection winding means and said power supply means, circuit means providing a control signal having first and second portions, and circuit means coupling said control signal to the control portion of said silicon gate controlled switch, said first portion of said control signal causing said silicon gate controlled switch to be conductive during the trace portion of said deflection wave to develop a sawtooth current wave in said deflection winding means, and said second portion of said control signal causing said switch to be non-conductive during retrace so that said deflection winding means rings during the retrace portion of said deflection wave.

2. A deflection system providing a deflection wave having a trace portion and a retrace portion to the deflection yoke of a cathode ray tube, said system including in combination, deflection winding means, direct current power supply means to supply current for said deflection winding means, a bistable semiconductor switching device having first, second, and control electrodes, and responsive to the translation of turn-on current in a predetermined direction between said first and control electrodes to establish said device in a first stable operating condition in which the path between said first and second electrodes is conductive, and responsive to a predetermined reverse current flow between said first and control electrodes to establish said device in a second stable operating condition in which the path between said first and second electrodes is substantially non-conductive, said first and second electrodes connected in a series circuit with said deflection winding means and said power supply means, and input circuit means coupled to said control electrode providing a first signal to switch said semiconductor switch into conduction during the trace portion of the deflection wave to develop a sawtooth current wave in said deflection winding means and to provide a second signal to switch said semiconductor switch into a non-conductive state during the retrace portion of the deflection wave so that said deflection winding means rings during the retrace portion of the deflection wave.

3. The deflection system of claim 2 in which said input circuit means includes a differentiating network to differentiate said first and second signals before providing same to said control electrode.

4. The deflection system of claim 2 in which said semiconductor switching device is a PNPN silicon gate controlled switch.

5. The deflection system of claim 4 in which said first electrode and said control electrode are respectively cathode and gate electrodes and the first signal is positive-going on said gate electrode with respect to said cathode electrode and said second signal is negative-going on said gate electrode with respect to said cathode electrode.

6. The deflection system of claim 5 in which said second signal exceeds the amplitude of said first signal at said gate electrode with respect to said cathode electrode.

References Cited

UNITED STATES PATENTS

| | | | |
|---|---|---|---|
| 2,966,641 | 8/1961 | Paynter | 315—27 |
| 3,097,335 | 7/1963 | Schmidt | 321—45 |
| 3,206,696 | 9/1965 | Wright | 331—107 |
| 3,210,601 | 10/1965 | Walker | 315—27 |
| 3,300,680 | 1/1967 | Saudinaitis | 315—29 |

OTHER REFERENCES

Radio Electronics, January 1955, pp. 43, 44, 45. "Portable Receiver," by Herzog, Lohman.

Westinghouse Silicon Controlled Rectifier Designers' Handbook, first edition, Apr. 30, 1964, pp. 4.22–4.28, 13–33, 7.93–7.94.

ROBERT L. GRIFFIN, *Primary Examiner.*

JOHN W. CALDWELL, *Examiner.*

R. K. ECKERT, *Assistant Examiner.*